(12) United States Patent
Lee

(10) Patent No.: US 7,108,815 B2
(45) Date of Patent: Sep. 19, 2006

(54) MOLDING PROCESS FOR MANUFACTURING A TUBULAR MOLDED ARTICLE

(75) Inventor: Yeou-Ching Lee, Taipei (TW)

(73) Assignee: Alvin Lee Jewelry, Inc., (TW)

( * ) Notice: Subject to any disclaimer, the term of this patent is extended or adjusted under 35 U.S.C. 154(b) by 236 days.

(21) Appl. No.: 10/785,294

(22) Filed: Feb. 23, 2004

(65) Prior Publication Data

US 2005/0084639 A1   Apr. 21, 2005

(30) Foreign Application Priority Data

Oct. 17, 2003   (TW) ............... 92128912 A

(51) Int. Cl.
*B29C 39/10* (2006.01)
*B29C 39/12* (2006.01)

(52) U.S. Cl. .............. 264/139; 264/247; 264/250; 264/274; 264/275

(58) Field of Classification Search .............. 264/139, 264/247, 255, 274, 275
See application file for complete search history.

(56) References Cited

U.S. PATENT DOCUMENTS

| 5,261,665 A * | 11/1993 | Downey ............... 473/303 |
| 6,399,009 B1 * | 6/2002 | Sato et al. ............. 264/400 |
| 6,403,004 B1 * | 6/2002 | Stecker ................ 264/139 |
| 6,503,430 B1 * | 1/2003 | Downey ............... 264/161 |

* cited by examiner

*Primary Examiner*—Edmund H. Lee
(74) *Attorney, Agent, or Firm*—Ostrolenk Faber, Gerb & Soffen, LLP

(57) ABSTRACT

A molding process for manufacturing a tubular molded article includes the steps of (a) preparing a mold that defines a mold cavity and that is formed with at least a protrusion protruding into the mold cavity, (b) placing a supporting member in the mold cavity, (c) introducing a first molding material into the mold cavity around the supporting member so as to form a first molded part around the supporting member and a decorating indentation in the first molded part, and (d) filling the decorating indentation in the first molded part with a second molding material so as to form a second molded part therein.

11 Claims, 7 Drawing Sheets

MOLDING PROCESS FOR MANUFACTURING A TUBULAR MOLDED ARTICLE

CROSS-REFERENCE TO RELATED APPLICATION

This application claims priority of Taiwanese Application No. 092128912, filed on Oct. 17, 2003.

BACKGROUND OF THE INVENTION

1. Field of the Invention

This invention relates to a molding process for manufacturing a tubular molded article, more particularly to a molding process for manufacturing a tubular molded article that includes a first molded part and a second molded part filling in an indentation in the first molded part.

2. Description of the Related Art

Tubular articles, such as pens, may be made from metal, wood, stone, or resin. The patterns formed on the conventional tubular articles for increasing the aesthetic value thereof are normally two dimensional, which does not have a solid physical structure in appearance. It is known in the art that the physical structure of a pattern on a tubular article can be achieved by having an outer tube sleeved co-axially on an inner tube. The outer tube is engraved so as to expose a portion of the inner tube therefrom. The inner and outer tubes can be made from different materials, and can have different colors so as to enhance the physical structure of the pattern. However, the appearance of the pattern formed on the aforesaid tubular article still lacks variety, such as variation in the degree of color lightness or darkness at different locations of the pattern.

SUMMARY OF THE INVENTION

Therefore, the object of the present invention is to provide a molding process for manufacturing a tubular molded article that is capable of overcoming the aforementioned drawbacks of the prior art.

According to one aspect of the present invention, there is provided a molding process for manufacturing a tubular molded article. The molding process comprises the steps of: (a) preparing a mold having a cavity-defining wall that defines a mold cavity and that is formed with at least a protrusion protruding therefrom into the mold cavity; (b) placing a supporting member in the mold cavity in such a manner that the supporting member is spaced apart from the cavity-defining wall of the mold; (c) introducing a first molding material into the mold cavity around the supporting member so as to form a first molded part around the supporting member and a decorating indentation in the first molded part, the decorating indentation having dimensions corresponding to those of the protrusion; and (d) filling the decorating indentation in the first molded part with a second molding material so as to form a second molded part therein.

According to another aspect of this invention, there is provided a tubular molded article that includes: a tubular first molded part that is formed with at least a decorating indentation; and a second molded part that fills the decorating indentation and that is integrally molded with the first molded part.

BRIEF DESCRIPTION OF THE DRAWING

In the following drawings which illustrate an embodiment of the invention.

DETAILED DESCRIPTION OF THE PREFERRED EMBODIMENT

Figure 1:
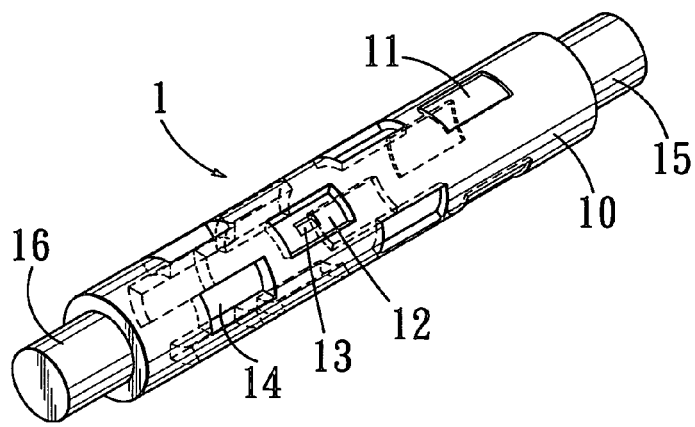
FIG. 1 is a perspective view of a pattern member used for forming a first mold according to the preferred embodiment of a molding process for manufacturing a tubular molded article of this invention.
Figure 2:
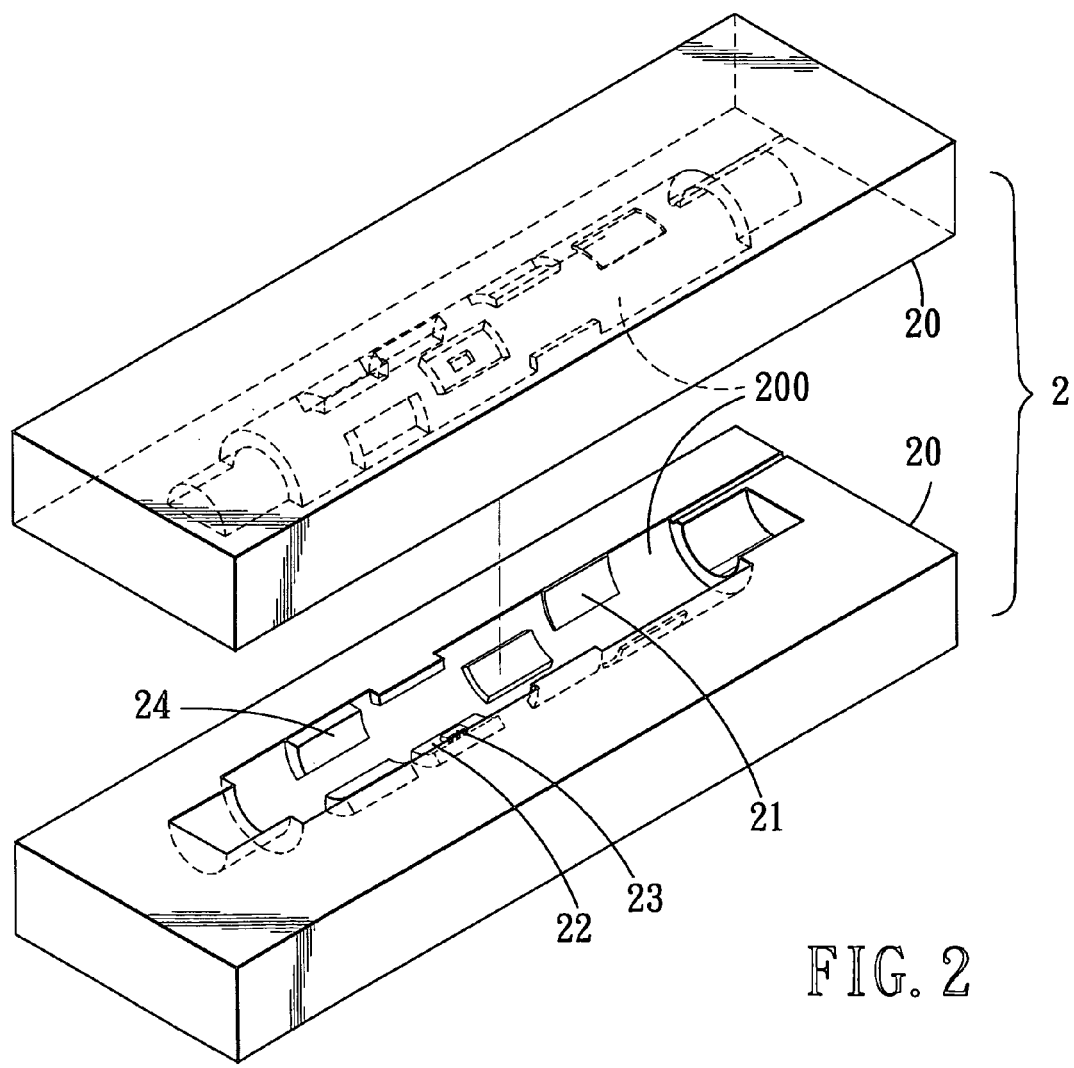
FIG. 2 is a perspective view of the first mold formed according to the preferred embodiment of the present invention.
Figure 3:
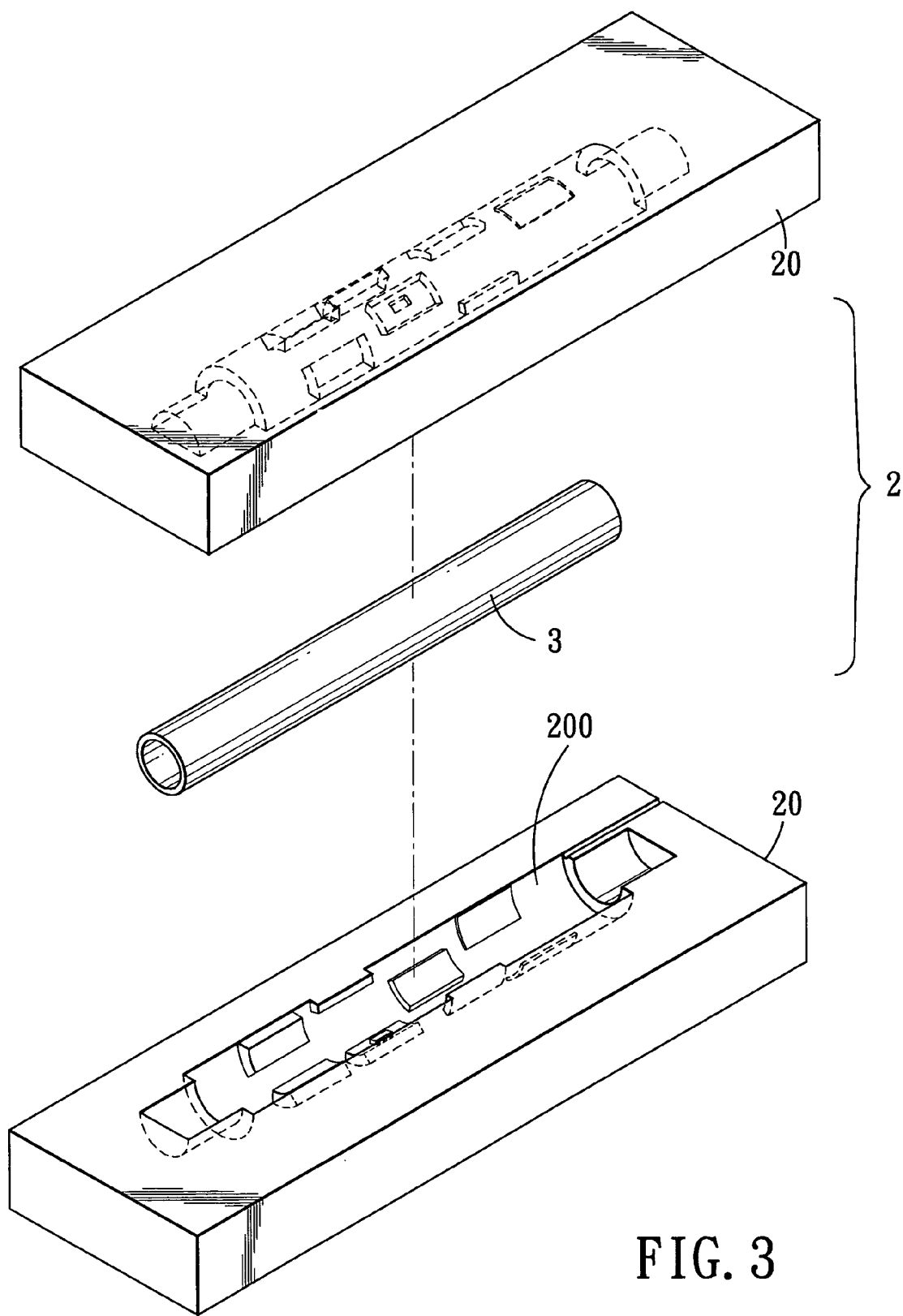
FIGS. 3 and 4 are perspective views to illustrate how a first molded part is formed on a supporting member using the mold shown in FIG. 2 according to the preferred embodiment of this invention.
Figure 4:
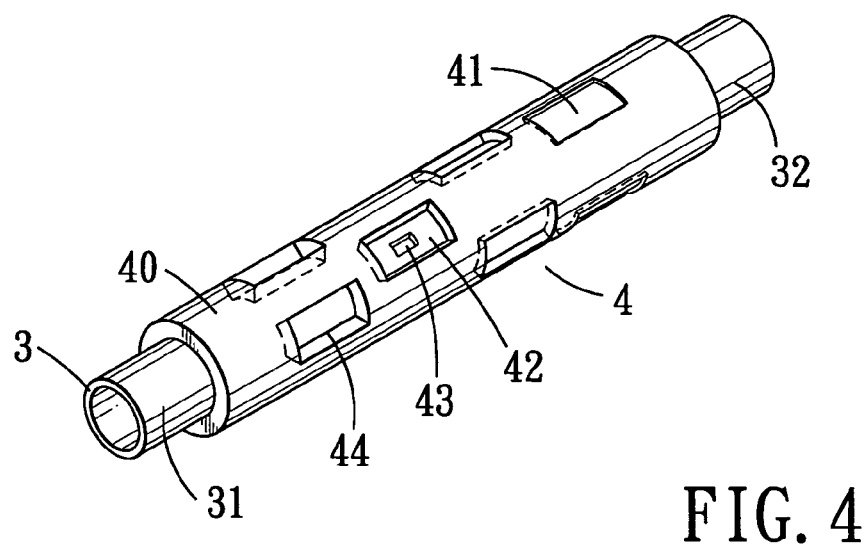
Figure 5:
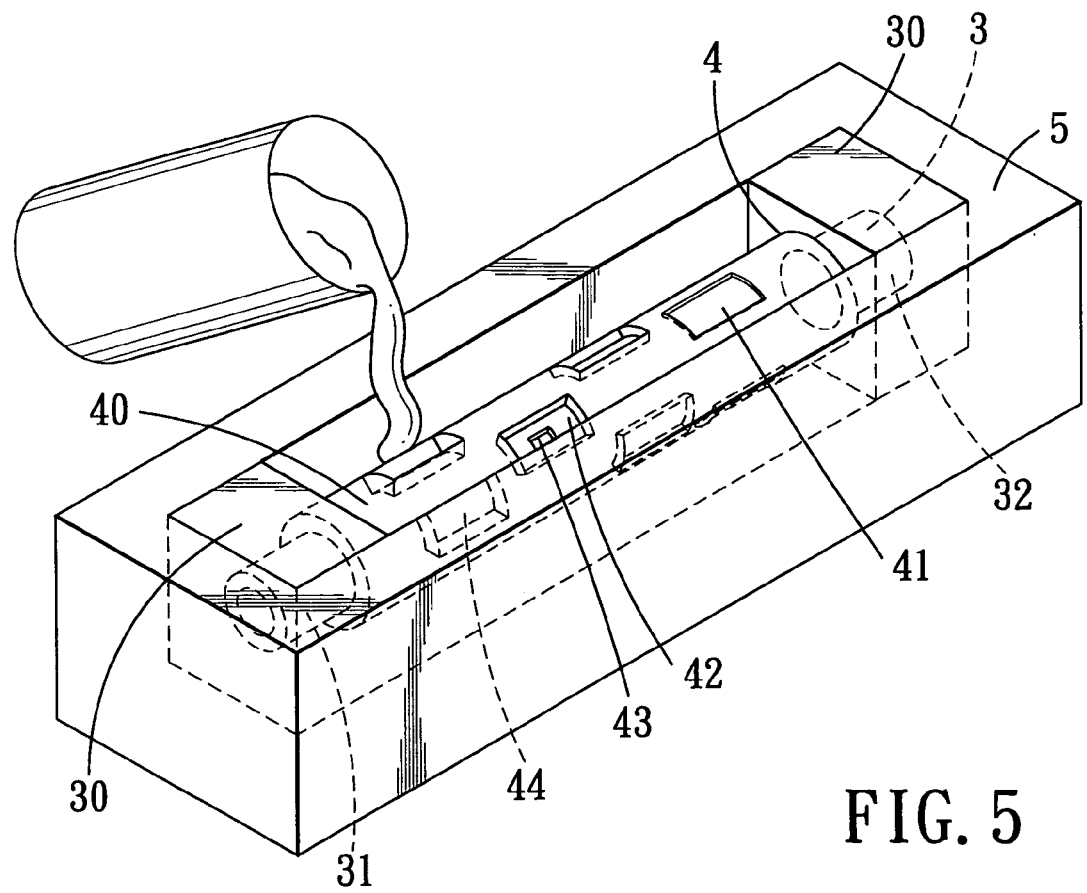
FIGS. 5 and 6 are perspective views to illustrate how second molded parts are formed in decorating indentations in the first molded part of FIG. 4 according to the preferred embodiment of this invention.
Figure 6:
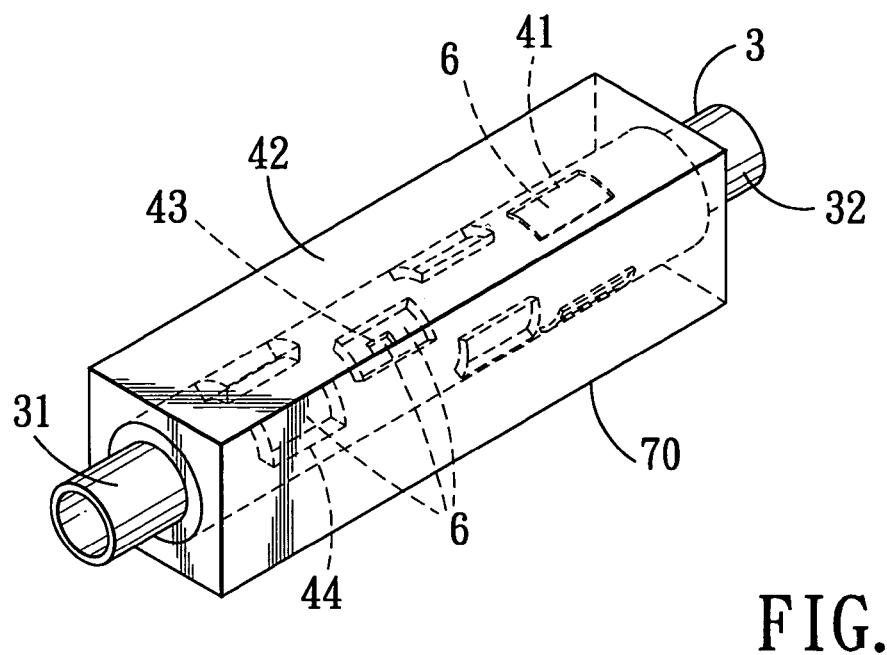
Figure 7:
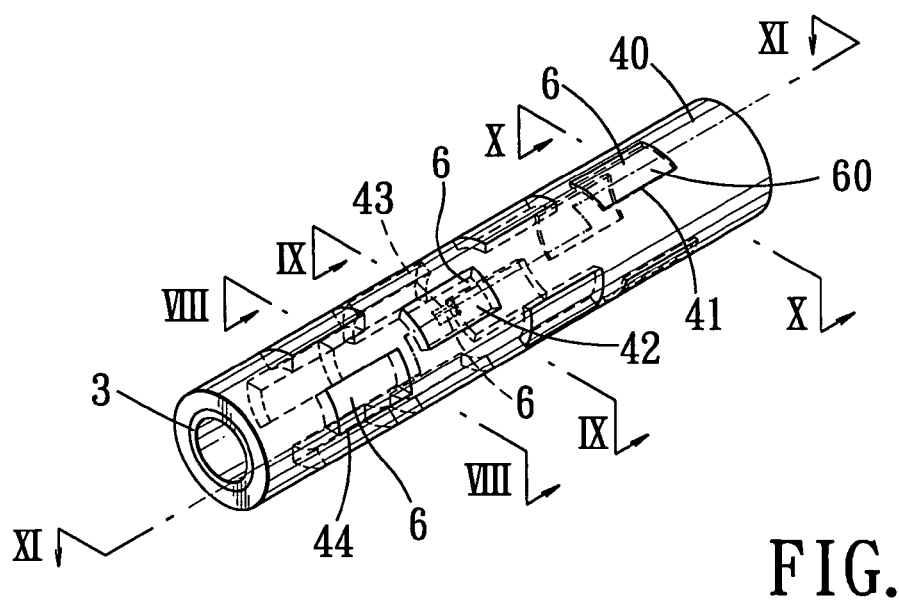
FIG. 7 is a perspective view of the tubular molded article formed according to the preferred embodiment of this invention.
Figure 8:
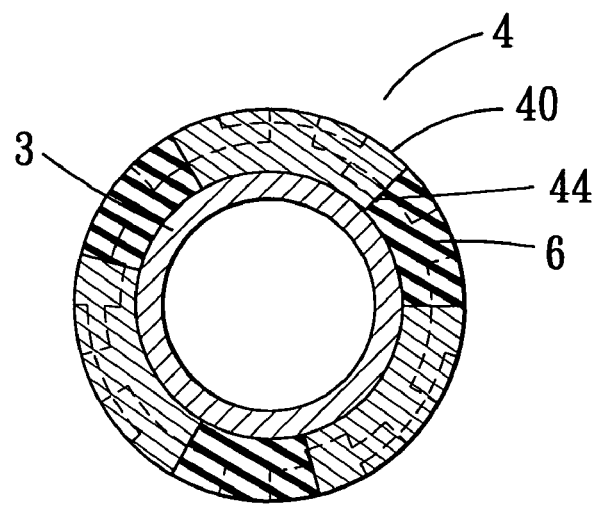
FIG. 8 is a sectional view taken along lines VIII—VIII in FIG. 7.
Figure 9:
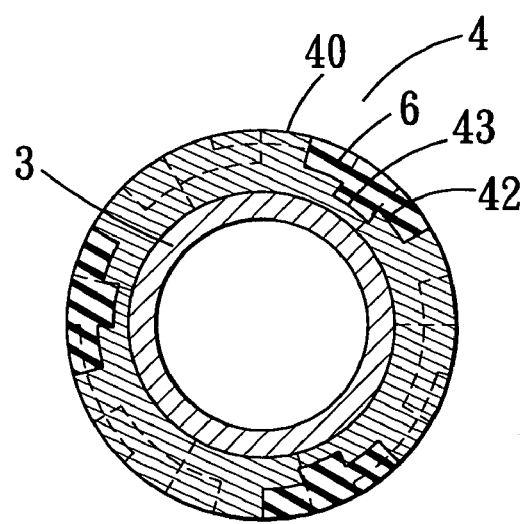
FIG. 9 is a sectional view taken along lines IX—IX in FIG. 7.
Figure 10:
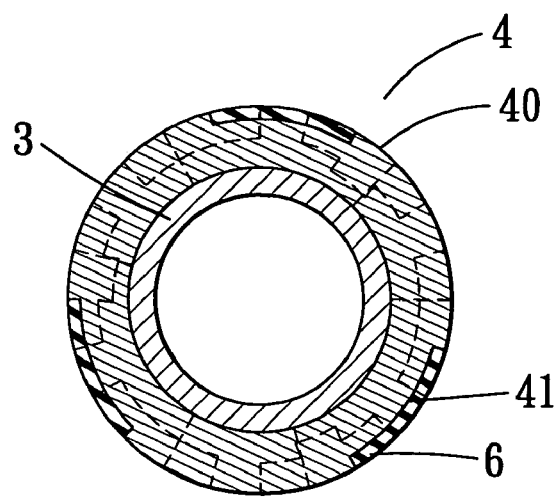
FIG. 10 is a sectional view taken along lines X—X in FIG. 7.
Figure 11:
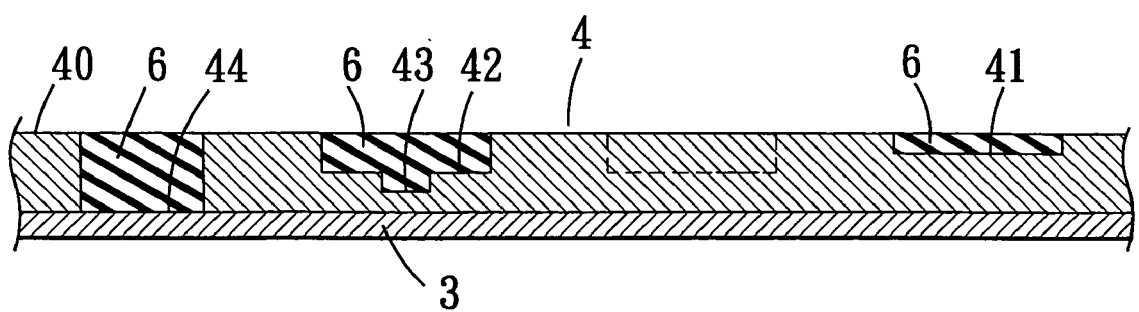
FIG. 11 is a sectional view taken along lines XI—XI in FIG. 7.

For the sake of brevity, same reference numerals are used to denote similar elements throughout the specification.

FIGS. 1 to 7 illustrate consecutive steps of the preferred embodiment of a molding process for manufacturing a tubular molded article of this invention. The molding process includes the steps of: (a) preparing a first mold 2 (see FIG. 2), which is formed by casting techniques using a pattern member 1 (see FIG. 1), the pattern member 1 being cylindrical in shape, having an outer surface 10 and two opposite reduced ends 15, 16, and being formed with first, second, third, and fourth pattern indentations 11, 12, 13, 14 that extend inwardly from the outer surface 10, the first mold 2 thus formed including first and second mold halves 20, 21 and having a cavity-defining wall that defines a mold cavity 200 and that is formed with first, second, third, and fourth protrusions 21, 22, 23, 24 protruding therefrom into the mold cavity 200 and having dimensions corresponding to those of the first, second, third, and fourth pattern indentations 11, 12, 13, 14 in the pattern member 1, respectively; (b) placing a supporting member 3, which is a tube in this embodiment, in the mold cavity 200 in the first mold 2 (see FIG. 3) in such a manner that the supporting member 3 is spaced apart from the cavity-defining wall of the first mold 2; (c) introducing a first molding material into the mold cavity 200 in the first mold 2 around the supporting member 3 so as to form a first molded part 4 around the supporting member 3 (see FIG. 4), and first, second, third, and fourth decorating indentations 41, 42, 43, 44 in the first molded part 4 that extend inwardly and radially from an outer surface 40 of the first molded part 4 and that have dimensions corresponding to those of the first, second, third, and fourth protrusions 21, 22, 23, 24, the supporting member 3 having two opposite ends 31, 32 that project outwardly and respectively from two opposite ends of the first molded part 4; (d) placing the first molded part 4 together with the supporting member 3 in a second mold 5 (see FIG. 5), and introducing a second molding material into the second mold 5 so as to form a molded layer 70 (see FIG. 6) that surrounds the first molded part 4 and that has a portion filling the first, second, third, and fourth decorating indentations 41, 42, 43, 44 to form second molded parts 6 therein, a pair of positioning blocks 30 being provided in the second mold 5 for positioning the opposite ends 31, 32 of the supporting member 3; and (e) removing the molded layer 70 from the first molded part 4 except for the second molded parts 6 to form the tubular molded article (see FIG. 7). The outer surface 40 of the first molded part 4 and an outer surface 60 of each second molded part 6 of the tubular molded article thus formed lie in the same cylindrical plane. Note that the opposite ends 31, 32 of the supporting member 3 are removed from the tubular molded article after removal of the molded layer 70.

The supporting member 3 and the first molding material can be made from a metal or a resin. The second molding material is a resin. In this embodiment, the supporting member 3 is made from a resin that has a softening point higher than that of the resin used for the first molding material so as to prevent deformation of the supporting member 3 during the molding process, and the first molding material has a softening point higher than that of the second molding material.

The first and second molded parts 4, 6 can be transparent or opaque when both are made from a resin. Preferably, each molded part 6 has a color different from those of the supporting member 3 and the first molded part 4.

In this embodiment, the depths of the first, second, third, and fourth decorating indentations 41, 42, 43, 44 in the first molded part 4 are different so that the second molded parts 6 in the first, second, third, and fourth decorating indentations 41, 42, 43, 44 have different radial thickness (see FIGS. 8 to 11), which permits variation in the degree of color lightness or darkness for the second molded parts 6, thereby enhancing the physical structure of the tubular molded article of this invention as compared to the prior art. Each of the first, second, and third decorating indentations 41, 42, 43 has a radial depth that is less than a radial thickness of the first molded part 4. Each of the fourth decorating indentations 44 extends radially through the first molded part 4 so as to expose the supporting member 3 therefrom.

Figure 12:
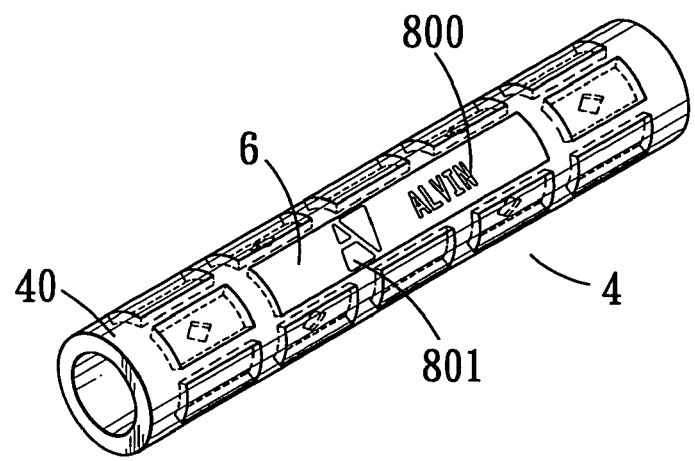
FIG. 12 is a perspective view of a modified tubular molded article formed according to the preferred embodiment of this invention using a pattern member modified from that of FIG. 1.

FIG. 12 illustrates a modified tubular molded article formed according to the preferred embodiment of this invention using a pattern member modified from that of FIG. 1. The modified tubular molded article is similar to that shown in FIG. 7, except that the supporting member 3, which serves as a mandrel, is removed from the tubular molded article and that the second molded parts 6 are formed with characters 801 or a trade mark 800.

Figure 13:
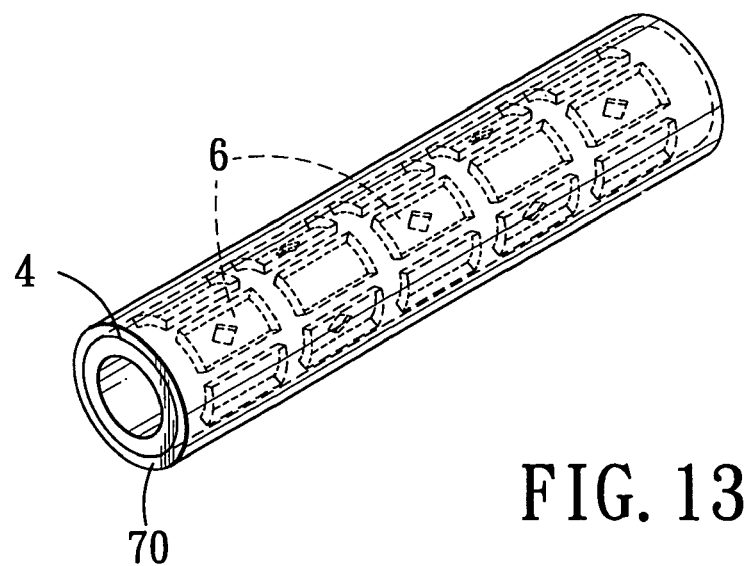
FIG. 13 is a perspective view of yet another modified tubular molded article formed according to the preferred embodiment of this invention.

FIG. 13 illustrates another modified tubular molded article formed according to the preferred embodiment of this invention. The modified tubular molded article differs from the tubular molded article shown in FIG. 7 in that the outer layer 70 remains on the first molded part 4 and is cut into a cylindrical shape to cover the outer surface 40 of the first molded part 4.

By virtue of the difference in thickness, the second molded parts 6 in the first, second, third, and fourth decorating indentations 41, 42, 43, 44 vary in the degree of color lightness or darkness, thereby eliminating the aforesaid drawback associated with the prior art.

With the invention thus explained, it is apparent that various modifications and variations can be made without departing from the spirit of the present invention. It is therefore intended that the invention be limited only as recited in the appended claims.

I claim:

1. A molding process for manufacturing a tubular molded article, comprising the steps of:
    (a) preparing a first mold having a cavity-defining wall that defines a mold cavity and that is formed with at least a protrusion protruding therefrom into said mold cavity;
    (b) placing a supporting member in said mold cavity in such a manner that said supporting member is spaced apart from said cavity-defining wall of said first mold;
    (c) introducing a first molding material into said mold cavity around said supporting member so as to form a first molded part around said supporting member and a decorating indentation in said first molded part, said decorating indentation having dimensions corresponding to those of said protrusion;
    (d) filling said decorating indentation in said first molded part with a second molding material so as to form a second molded part therein; and
    removing said supporting member from said first and second molded parts after said step of filling said decorating indentation;
    wherein said second molded part is formed by placing said first molded part together with said supporting member in a second mold, introducing said second molding material into said second mold so as to form a molded layer that surrounds said first molded part and that has a portion filling said decorating indentation to define said second molded part, and removing said molded layer from said first molded part except for said second molded part, said first and second molded parts having outer surfaces, respectively, which lie in the same cylindrical plane.

2. The molding process of claim 1, wherein said first mold is prepared by casting techniques using a pattern member that is cylindrical in shape, that has an outer surface, and that is formed with at least a pattern indentation extending inwardly from said outer surface and having dimensions corresponding to those of said decorating indentation in said first molded part so as to form said protrusion on said cavity-defining wall of said first mold.

3. The molding process of claim 1, wherein said supporting member is made from a metal.

4. The molding process of claim 1, wherein said first molding material is made from a metal.

5. The molding process of claim 1, wherein said first molding material is a resin.

6. The molding process of claim 5, wherein said first molded part is transparent.

7. The molding process of claim 1, wherein said second molding material is a resin.

8. The molding process of claim 7, wherein said second molded part is transparent and has a color different from that of said first molded part.

9. The molding process of claim 1, wherein said decorating indentation extends radially through said first molded part so as to expose said supporting member therefrom.

10. The molding process of claim 1, wherein said decorating indentation has a radial depth less than a radial thickness of said first molded part.

11. The molding process of claim 1, wherein said supporting member is a tube.

* * * * *